United States Patent [19]

Eigenmann

[11] E Re. 31,291

[45] Reissued Jun. 28, 1983

[54] ROAD SURFACE MARKING PREFABRICATED TAPE MATERIAL, HAVING RETROREFLECTIVE COMPOSITE ELEMENTS ASSOCIATED THERETO

[76] Inventor: Ludwig Eigenmann, Vacallo, Ticino, Switzerland

[21] Appl. No.: 189,771

[22] Filed: Sep. 22, 1980

Related U.S. Patent Documents

Reissue of:

[64] Patent No.: 4,129,397
Issued: Dec. 12, 1978
Appl. No.: 850,024
Filed: Nov. 9, 1977

[30] Foreign Application Priority Data

Nov. 10, 1976 [IT] Italy ..... 29196 A/76

[51] Int. Cl.[3] ..... E01F 9/04
[52] U.S. Cl. ..... 404/14
[58] Field of Search ..... 404/14, 15, 16, 9, 12; 350/103, 105, 106, 109

[56] References Cited

U.S. PATENT DOCUMENTS

| | | | |
|---|---|---|---|
| 1,661,242 | 3/1928 | Truxal | 404/12 |
| 2,268,538 | 12/1941 | Rodli | 404/14 |
| 2,430,534 | 11/1947 | Rodli | 404/16 X |
| 3,392,639 | 7/1968 | Heenan | 404/12 |
| 3,399,607 | 9/1968 | Eigenmann | 404/12 |
| 3,485,148 | 12/1969 | Heenan | 404/12 |
| 3,817,596 | 6/1974 | Tanaka | 404/9 X |
| 3,836,275 | 9/1974 | Finch | 404/13 |
| 3,879,148 | 4/1975 | Eigenmann | 404/16 X |
| 3,920,346 | 11/1975 | Wyckoff | 404/14 |
| 3,996,556 | 12/1976 | Eigenmann | 404/14 X |
| 4,040,760 | 8/1977 | Wyckoff | 404/14 |
| 4,069,281 | 1/1978 | Eigenmann | 404/16 X |

*Primary Examiner*—Nile C. Byers, Jr.
*Attorney, Agent, or Firm*—Michael J. Striker

[57] ABSTRACT

A prefabricated road surface marking tape material consisting of a factory prefabricated and assembled structure comprising a tape component and a plurality of retroreflective sheltered elements bulging above said tape, spacedly distributed lengthwise of the tape, and secured thereon in a such position that the light emitted by headlamps of a vehicle travelling on the road in the direction of the tape and impinging on said reflective means comprised in each element, will be retroreflected in form of a relatively narrow beam of light precisely directed towards the driver of the vehicle, for improved nighttime visibility of the sign.

9 Claims, 9 Drawing Figures

ROAD SURFACE MARKING PREFABRICATED TAPE MATERIAL, HAVING RETROREFLECTIVE COMPOSITE ELEMENTS ASSOCIATED THERETO

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the art of forming traffic regulating signs or strips on roadway pavements and, more particularly, to providing a roadway pavement with traffic regulating and facilitating means such as traffic lanes dividing lines, roadway edge dividing lines and the like, by applying and securing on the roadway pavement surface a factory prefabricated tape material.

More specifically this invention concerns the art of forming traffic regulating signs and lines formed with prefabricated tape material the upper face of which is provided with retroreflective or retrocollimating elements capable of ensuring nighttime visibility at a safe visibility distance when the substantially sole source of light is provided by the headlamps of motor vehicles which travel along the road, that is a source of light the rays of which impinge on the tape surface at spots well in advance of the position of the vehicle, and travel in a direction which forms either a small or a very small angle with the generally planar surface of the roadway pavement and of the marking tape applied thereon.

2. Description of the Prior Art

This art is a well worked one and a wide patent literature describes several embodiments of this art. Various procedures, machines and compositions have been proposed for expediting the prefabrication of such tape materials and retroreflective means and applying and adhesively securing said material on and to a suitably prepared roadway pavement. The U.S. Pat. Nos. 3,587,415, 3,879,148 and 3,958,891 (corresponding to British patent specifications Nos. 1,245,834, 1,465,585 and 1,459,273), of the present applicant, are examples of such literature.

Traffic safety evidently depends on the above considered safety visibility distance at which brilliant spots provided by the retroreflectivity of individual retrocollimating elements can be clearly and unmistakeably seen by the vehicle's driver. The brilliancy of such spots depends on the efficiency of the retroreflecting means and is proportional to the effective cross-sectional area of the impinging and reflected beam of rays (that is the actual operatable impinged area). The amplitude of this area is therefore a most important factor.

Other means have been proposed and are currently produced and made use of for improving the visibility of roadway edge delineations at a distance. Such means, commonly indicated by the simple term "markers", consist of a sturdy generally metallic structure wherein one or more light reflective elements are accommodated and at least partially sheltered against traffic wear. Such markers are generally bulky and promote dangerous jerks in rapidly traveling vehicles which pass over them (such markers provide a valuable aid when delineating roadway edges, pedestrian crossings and the like, but they are undesirable say along highways and traffic lane dividing lines).

Such markers are costly, as to their manufacture and to their laying on and securing to the roadway pavement. Each marker is necessarily individually placed in its required location and requires working of the conglomerate or aggregate pavement composition. Even if mechanical tools can facilitate the operation, the securing of individual markers requires competent workmen and involves substantial labour.

On the other hand the provision of sharply bulging retroreflective elements comprising efficient light reflective components having a substantial reflective area exposed to grazing light impingement, is advantageous when considered from the sole point of view of nighttime visibility at a distance, and also in rainy weather, when a layer of water is formed upon the road surface and covers only slightly bulging retroreflective elements, preventing retrocollimation.

SUMMARY OF THE INVENTION

It is therefore an object of this invention to provide a new useful material which can be associated with a roadway pavement and which provides, in combination, the advantages of both the well known prefabricated road marking tape materials having retroreflective element secured thereto, and of markers having efficient retrocollimating elements provided with a large (proportionally to their dimensions) effectively impinged area and bulging height.

According to the broadest aspect of the invention, there is provided a factory prefabricated composite roadway surface marking tape material comprising a tape component designed to be superimposed and firmly secured to a roadway surface to form a traffic aid thereon, and having an upper face, and a plurality of protrusions distributed lengthwise along said upper face at spaced locations, each protrusion consisting of one both retroreflective and structurally traffic resisting element having a base portion fixedly secured to said tape component, an optically reflective portion secured to and at least partially sheltered in a component integral with said base portion and positioned in said component for protruding above said upper face for impingement and retroreflection of light rays in a direction generally longitudinal of the tape and forming a very small angle with the road surface.

The thus prefabricated composite tape material, wherein the bulging retroreflective protrusions have been factory applied and secured to the tape component, can be readily wound in coils for storage and transportation to the locations where it is supposed to be applied, and its application on the road can be performed in the manner and by taking advantage of the known mechanical facilities used in the art of applying conventional road marking prefabricated road marking tape materials.

According to possible embodiments of the invention, the elements each comprise a properly structural component having the said base portion and one or more recesses integrally formed for housing the properly optical component or components. Said components can be made of polymeric compounds and connected to each other by adhesives, such as epoxies, or preferably by ultrasonic welding.

The structural component can be made of a highly stress resistant and suitably resilient resinous material such as a [mixted] *mixed* acrylonitrile-butadiene-styrene copolymer (ABS) or of a polycarbonate. The optical component is made of a highly transparent resin, such as polymethylmethacrylate or also of polycarbonate. When compatible with the geometry of the element, the structural and sheltering portion and the retroreflective portion can be integrally formed of a transparent polycarbonate.

The said protrusions can have a height from 5 to 10 mm, in some cases 15 mm above the upper face of the tape component. The protrusions are spaced along the tape component at intervals of from 50 to 500 times the height of the protrusions, preferably from 1 to 2 meters. Generally, the protrusions are each formed of a number of preformed elements secured side by side into alignment transversal of the tape, by a suitable adhesive, such as an epoxy, or by the composition, such as polyurethane, of which the upper layer of the tape component is formed. The mass production of the tape material is facilitated by producing a primary tape of relevant width, securing over said primary tape alignment of elements (provisionally connected to each other by adhesive tape) and then cutting lengthwise the thus completed primary wide tape into strips each wide enough to form a tape material article ready to be coiled, transported and applied to a roadway pavement to form a most efficient daytime and nighttime visibility sign.

Other objects and advantages of the invention will be apparent from the following description, taken in conjunction with the accompanying drawings.

THE VIEWS OF THE DRAWINGS

Figures 1, 2, 3, 4, 5, 6, 7A, 7B, 8:
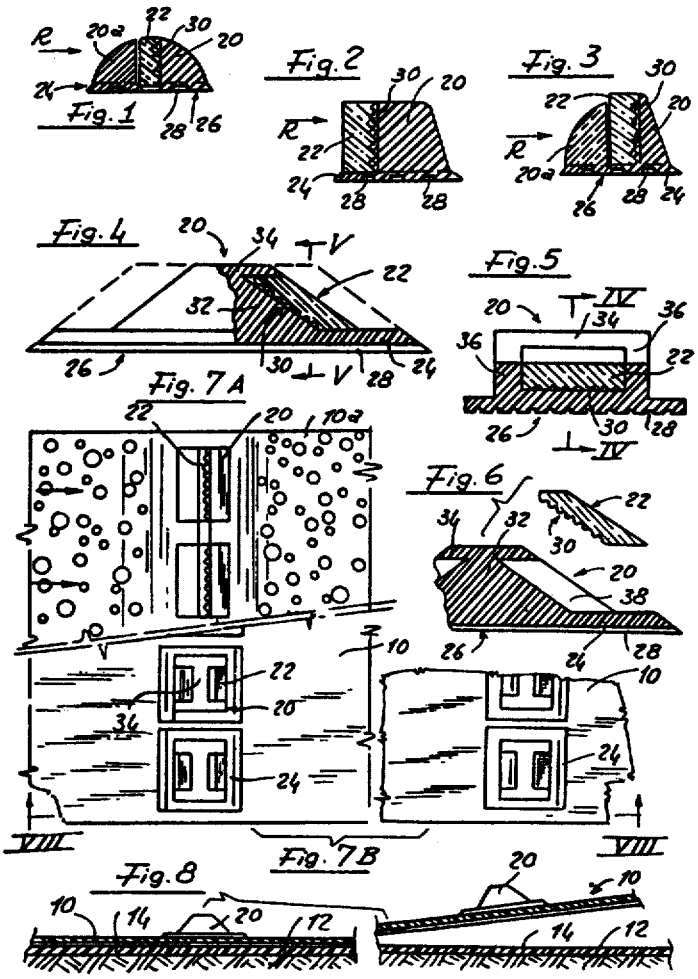
FIGS. 1, 2 and 3 are longitudinal vertical sectional views of three embodiments of one structural and reflective element, before its association with the tape component.
FIG. 4 illustrates a preferred embodiment of the element, partially in side elevation and partially in sectional view taken on the line IV—IV of FIG. 5.
FIG. 5 is another sectional view taken on line V—V of FIG. 4.
FIG. 6 is a fragmentary exploded view of the element of FIG. 4.

FIGS. 7A and 7B are fragmentary views from above of parts of a tape material according to the invention, wherein FIG. 7A comprises a tape component having small conventional globular retroreflective elements and protrusions formed of elements of the type of FIG. 1, and FIG. 7B has protrusions formed of elements of the type of FIGS. 4 to 6 on a not superficially reflective tape; and FIG. 8 fragmentarily illustrates the tape material of FIG. 7B in a longitudinal sectional view taken on line VIII—VIII of FIG. 7B.

DESCRIPTION OF THE PREFERRED EMBODIMENTS

The tape component is generally indicated at 10 in FIGS. 7B and 8. Such tape component, as individually considered, is preferably made of a multilayer structure as known in the art and described in the patent literature. Preferably the said tape 10 is laid upon a "primer" layer 14 over the pavement 12 and it has a multilayer structure as described in the published French and German (Western) patent applications 77 04466 and respectively P 27 02 442.6 (corresponding to the U.S. patent application Serial No. 738,693, filed Jan. 12, 1977) of the present applicant. This disclosed structure comprises an intermediate non-woven fibrous layer which provides a high tensile resistance to the tape, which therefore is resistant to the tearing forces which can be applied to the protrusions by the vehicle traffic.

The upper face of the tape component might be provided with known globular refractive-reflective retrocollimating elements, as shown in the embodiment indicated at 10a in FIG. 7A. On the other hand, the surprising nighttime visibility at distance, provided by the protrusions according to the invention and as described below, makes the provision of further retrocollimating elements unnecessary, which therefore do not appear in the embodiments of FIGS. 7B and 8, wherein the known tape component 10 is assumed to have an also conventional anti-skid upper face, not described in detail.

The retroreflective protrusions are individually formed by one or few elements, preferably composite, including a properly structural component generally indicated at 20, and at least one properly reflective component generally indicated at 22. This latter component 22 preferably consists of a flat prism or tablet 22 having one major face (turned toward the impinging light in the direction indicated by arrows R) which is essentially planar and polished, and a reflector forming an opposite face 30 which is shaped for total reflection such as with cube-corner type reliefs, for example.

The structural element critically comprises a base portion 24 having a generally planar underface 26 designed to be applied on and adhesively secured to the upper face of the tape component. Preferably, the underface 26 is grooved or otherwise designed for best attachment to the tape, such as being provided with a plurality of small rectangular grooves 28. Further, the base portion 24 is larger (in plan view) than the bulging parts of the element, to form undercuts for secure connection with the upper tape layer, or with a layer formed by a suitable adhesive over the upper tape face.

In the embodiment of FIGS. 4 to 6, 7B and 8, the properly structural component 20 has a convergent bulging portion 32, sidewalls 36 and an upper portion 34 to provide and confine a recess 38 (FIG. 6) wherein a reflective component 22 can be precision seated and fixedly secured, say by ultrasonic welding. The entire element 20, 22 forms therefore a small but sturdy and highly stress resistant unit, wherein the optically active component 22 is sheltered for protection from traffic damage while same component 22 is fully exposed to the impinging light for optimizing the retroreflection.

In the above described embodiments prism-shaped retroreflective portions or components are provided. Such portions or components can however be replaced by or complemented with other known retrocollimating means. For example globular retrocollimating elements or preferably retrocollimating means of the improved type described and shown in the published French and [Germany] *German* (Western) patent applications No. 76 24805 and respectively P 26 32 107.3 (corresponding to the U.S. patent application Ser. No. 705,596, filed July 13, 1976) of the present applicant, can be seated in the structural component, adjacent to the lower edge portion of the retroreflective tablet 22, in an element of the type shown in FIGS. 4 to 6.

Briefly summarizing the above described invention, it is evident that the invention provides very important advantages, both as to economy of producing and applying a highly efficient road marking material and as to the safety of traffic ensured by the actual use of same material. Namely:

(i) The road marking material can be completely factory produced, assembled and prepared in coils or in stocks of piled lengths for storage and transportation. The thus prepared material can be laid on and adhesively secured to the road pavement so that a complete highly efficient material having daytime and nighttime visibility is formed without further operations, by taking full advantage of the known machines, apparatuses, procedures and compounds actually available for applying road marking tape materials.

(ii) The critical features that the retroreflective elements are factory associated to the tape component ensures that such elements are uniformly and exactly positioned and oriented in the direction defined by the same tape component (or at a predetermined given angle therewith). The narrow beams of light individually retroreflected by the elements are therefore perfectly directed for their visibility by the vehicle drivers, simply by the laying of the prefabricated composite material of the invention.

(iii) The optical reflective portion of each element is capable of retroreflecting substantially the entire amount of light impinging thereon. Generally, the source of light (the vehicle headlamps) [it] *is* at a relevant distance from the impinged elements and therefore the impinging rays are nearly parallel. The retroreflected light is consequently limited and confined in a substantially narrow beam. The above commented critical exact orientation of the optical reflective portions present on the road directs and concentrates the respective reflected beams towards the vehicle drivers for best exploitation of the available and retroreflectable luminous energy.

The perfect orientation of the retroreflected beams, resulting from the critical feature mentioned above at (ii) and from the easily obtainable directionality of the tape material being laid on the road pavement, provides an unexpectedly good nighttime visibility at distance, as confirmed by extensive experimentation, both in fair and in rainy weather.

I claim:

1. A prefabricated road-surface marking tape, comprising a tape adapted to be placed on and secured to a road surface to form a traffic aid thereon; a plurality of reflectors spaced lengthwise of and upwardly projecting from an upper face of said tape, each of said reflectors comprising a casing having a generally planar base portion of a first width and having a bottom face juxtaposed with said upper face, and a receiver portion of a smaller second width projecting upwardly from said base portion, and an optically reflective element mounted and sheltered in said receiver portion and operative for retroreflecting a relatively narrow beam of light lengthwise of said tape in one direction when impinged by vehicle-emitted light rays travelling in the opposite direction; and means including a plurality of recesses in said bottom face and accommodating portions of said tape therein, for fixedly anchoring said reflectors to said tape.

2. The road surface marking tape of claim 1, said reflective elements being fixedly positioned for retroreflecting a defined beam of light in a direction generally longitudinal of the tape and forming a very small angle with the road surface, when impinged by light rays forming essentially same angle and having an essentially corresponding but opposite direction.

3. The road surface marking tape of claim 2, said reflective [element] *elements* comprising a prism of transparent material having an essentially planar major face positioned for light impingement and a retroreflective rear face arranged for retroreflecting essentially the entire impinging light.

4. The road surface marking tape of claim 1, wherein said reflectors project from 5 to 15 mm above the upper face.

5. The road surface marking tape of claim 1, wherein said base portion has undercut forming edges.

6. The road surface marking tape of claim 1, wherein said reflectors comprise components made of a high resistance polymeric resinous substance.

7. The road surface marking tape of claim 6, said casings being made of an acrylonitrile-butadiene-styrene resin or of a polycarbonate resin.

8. The road surface marking tape of claim 6, said reflective elements being made of transparent methylmethacrylate resin or of a polycarbonate resin.

*9. A prefabricated road-surface marking tape, comprising a tape adapted to be placed on and secured to a road surface to form a traffic aid thereon; a plurality of reflectors spaced lengthwise of and upwardly projecting from an upper face of said tape, each of said reflectors comprising a casing having a generally planar base portion of a first width and having a bottom face juxtaposed with said upper face, and a receiver portion of a smaller second width projecting upwardly from said base portion, and optically reflective elements sheltered in said receiver portion and operative for retroreflecting a relatively narrow beam of light lengthwise of said tape in one direction when impinged by vehicle-emitted light rays travelling in the opposite direction; and means including a plurality of recesses in said bottom face and accommodating portions of said tape therein, for fixedly anchoring said reflectors to said tape.*

* * * * *